United States Patent
Borlick et al.

(10) Patent No.: US 12,293,075 B1
(45) Date of Patent: May 6, 2025

(54) TASK ADJUSTMENT FOR UNIFORM PERFORMANCE OF DRIVES

(71) Applicant: INTERNATIONAL BUSINESS MACHINES CORPORATION, Armonk, NY (US)

(72) Inventors: Matthew G. Borlick, Tucson, AZ (US); Beth Ann Peterson, Tucson, AZ (US); Lokesh Mohan Gupta, Tucson, AZ (US); Clint A. Hardy, Tucson, AZ (US)

(73) Assignee: INTERNATIONAL BUSINESS CORPORATION, Armonk, NY (US)

( * ) Notice: Subject to any disclaimer, the term of this patent is extended or adjusted under 35 U.S.C. 154(b) by 0 days.

(21) Appl. No.: 18/487,426

(22) Filed: Oct. 16, 2023

(51) Int. Cl.
*G06F 3/06* (2006.01)

(52) U.S. Cl.
CPC .......... *G06F 3/0607* (2013.01); *G06F 3/0631* (2013.01); *G06F 3/0689* (2013.01)

(58) Field of Classification Search
CPC ..... G06F 3/0607; G06F 3/0631; G06F 3/0689
See application file for complete search history.

(56) References Cited

U.S. PATENT DOCUMENTS

| | | | |
|---|---|---|---|
| 10,228,866 B2 | 3/2019 | Gerhart | |
| 11,086,752 B2 | 8/2021 | Ramanath | |
| 2014/0082303 A1* | 3/2014 | Ash .................... | G06F 3/0685 711/E12.001 |
| 2019/0347021 A1* | 11/2019 | Gupta .................. | G06F 3/0689 |

OTHER PUBLICATIONS

"An Optimised RAID Forming and Rebuilding Solution," IP.com, IPCOM000252308D, Jan. 4, 2018, 3 pp.

* cited by examiner

*Primary Examiner* — Eric Cardwell
(74) *Attorney, Agent, or Firm* — KONRAD, RAYNES, DAVDA & VICTOR LLP; Janaki K. Davda

(57) ABSTRACT

Provided are techniques for task adjustment for uniform performance of drives. Arrays are created for different drive types. Performance benchmarks are run for each of the arrays to compute a stage maximum value and a destage maximum value for each of the drive types. At run time, in response to determining that a mode indictor indicates a uniform performance mode, a maximum number of stage Task Control Blocks (TCBs) are set to a stage maximum uniform value and a maximum number of destage TCBs are set to a destage maximum uniform value. The stage of first data is performed using an actual number of stage TCBs that do not exceed the maximum number of stage TCBs. The destage of second data is performed using an actual number of destage TCBs that do not exceed the maximum number of destage TCBs.

17 Claims, 11 Drawing Sheets

Performance Values 124

- Stage Maximum (StageMax) Values 210
- Destage Maximum (DestageMax) Values 230
- Average Response Time Stage (AverageResponseTimeStage) Values 212
- Average Response Time Destage (AverageResponseTimeDestage) Values 232
- Stage Maximum Optimal (StageMaxOptimal) Value 214
- Destage Maximum Optimal (DestageMaxOptimal) Value 234
- Stage Maximum Uniform (StageMaxUniform) Value 216
- Destage Maximum Uniform (DestageMaxUniform) Value 236
- Minimum Response Time Stage (MinResponseTimeStage) Value 218
- Minimum Response Time Destage (MinResponseTimeDestage) Value 238
- Delta Response Time Stage (DeltaResponseTimeStage) Value 220
- Delta Response Time Destage (DeltaResponseTimeDestage) Value 240

FIG. 2

ActualStageTCBs: Compute actual stage TCBs based on the queue size of the TCBs waiting for stage TCBs.

If queue size is less than a threshold X, then actual stage TCBs is X.
Else stage TCBs is X + (queue size -X)/N where N is a constant.

FIG. 6A

ActualDestageTCBs: Compute actual destage TCBs based on NVS usage by that rank as follows:

$$\frac{(\text{RankNVSMaxAllowed} - \text{RankNVSUsage})}{(\text{RankNVSMaxAllowed} - \text{RankNVSlowThreshold})} * M$$

Where M is a constant

FIG. 6B

TASK ADJUSTMENT FOR UNIFORM PERFORMANCE OF DRIVES

BACKGROUND

1. Field of the Invention

The present invention relates to a computer program product, system, and method for task adjustment for uniform performance of drives. In certain embodiments, the task adjustment for uniform performance of drives may occur during drive qualification.

2. Description of the Related Art

A storage system consists of numerous storage devices configured, for example, in an array to represent a single combined storage space, such as a group of numerous storage devices in a Redundant Array of Independent Disks (RAID) array or a Just a Bunch of Disks (JBOD) array. A storage system may be comprised of heterogeneous storage devices having different performance capabilities.

SUMMARY

Provided are a computer program product, system, and method for task adjustment for uniform performance of drives. Arrays are created for different drive types, where drives in each of the arrays are certified at a same performance level and are of a same drive type. Performance benchmarks are run for each of the arrays to compute a stage maximum value and a destage maximum value for each of the drive types. At run time, in response to determining that a mode indictor indicates a uniform performance mode, a maximum number of stage Task Control Blocks (TCBs) are set to a stage maximum uniform value that comprises a minimum of the stage maximum values obtained across the drive types and a maximum number of destage TCBs are set to a destage maximum uniform value that comprises a minimum of the destage maximum values obtained across the drive types. A stage of first data is performed using an actual number of stage TCBs that do not exceed the maximum number of stage TCBs. A destage of second data is performed using an actual number of destage TCBs that do not exceed the maximum number of destage TCBs.

BRIEF DESCRIPTION OF THE DRAWINGS

FIG. 2 illustrates performance data in accordance with certain embodiments.

FIGS. 6A and 6B illustrate computing an actual number of stage TCBs and destage TCBs in accordance with certain embodiments.

DETAILED DESCRIPTION

Figure 1:
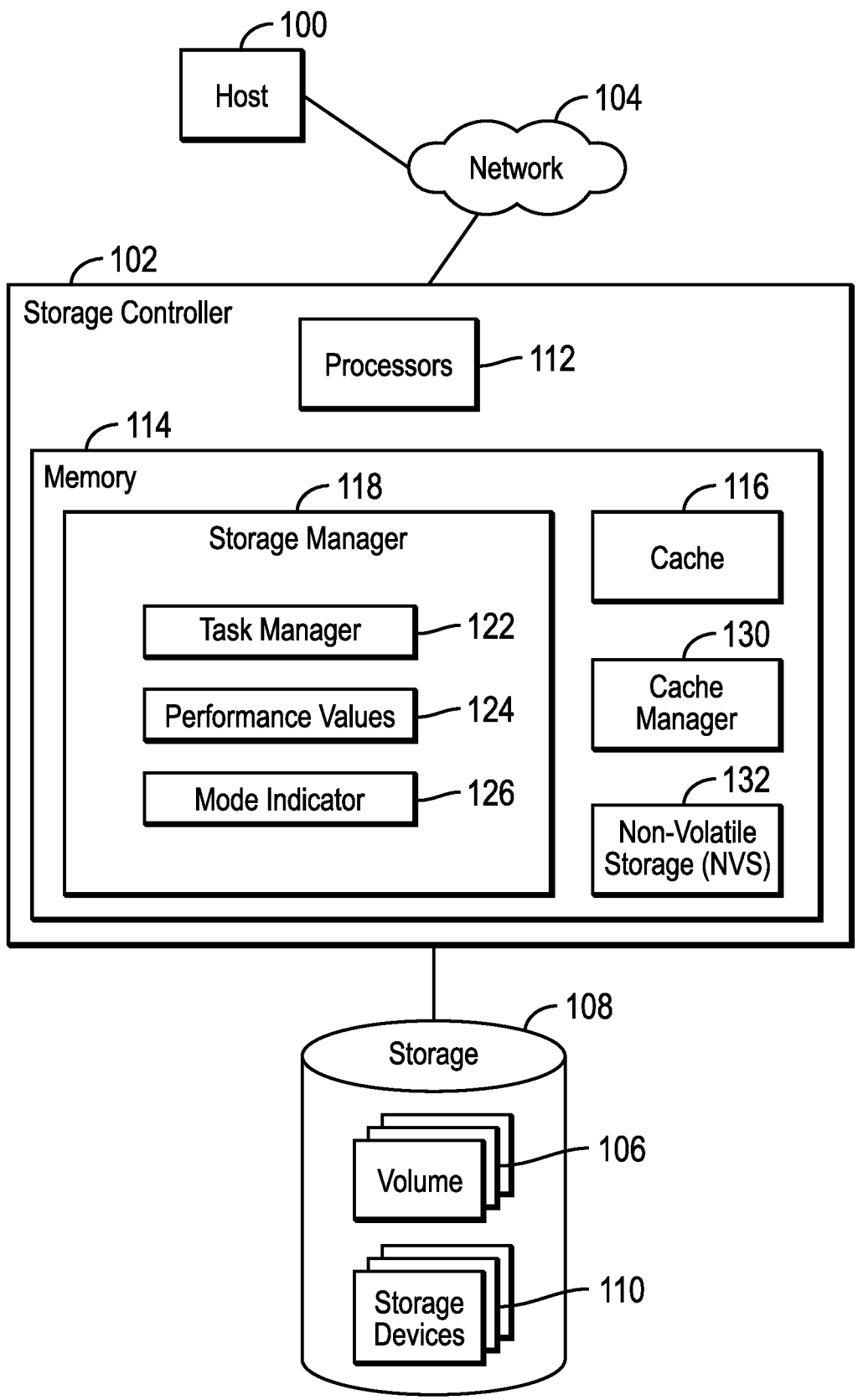
FIG. 1 illustrates a storage environment in accordance with certain embodiments.

The description herein provides examples of embodiments of the invention, and variations and substitutions may be made in other embodiments. Several examples will now be provided to clarify various aspects of the present disclosure:

Example 1: A computer program product, the computer program product comprising a computer readable storage medium having program instructions embodied therewith, the program instructions executable by a processor to cause the processor to perform operations for task adjustment for uniform performance of drives. The program instructions are executable by the processor to cause the processor to perform operations for creating arrays for different drive types, wherein drives in each of the arrays are certified at a same performance level and are of a same drive type. The program instructions are executable by the processor to cause the processor to perform operations for running performance benchmarks for each of the arrays to compute a stage maximum value and a destage maximum value for each of the drive types. The program instructions are executable by the processor to cause the processor to perform operations for, at run time, in response to determining that a mode indictor indicates a uniform performance mode, setting a maximum number of stage Task Control Blocks (TCBs) to a stage maximum uniform value that comprises a minimum of the stage maximum values obtained across the drive types and setting a maximum number of destage TCBs to a destage maximum uniform value that comprises a minimum of the destage maximum values obtained across the drive types. The program instructions are executable by the processor to cause the processor to perform operations for performing a stage of first data using an actual number of stage TCBs that do not exceed the maximum number of stage TCBs. The program instructions are executable by the processor to cause the processor to perform operations for performing a destage of second data using an actual number of destage TCBs that do not exceed the maximum number of destage TCBs. In this manner, even if the drive types have different performance levels, embodiments advantageously limit the actual number of stage TCBs to the maximum number of stage TCBs and limit the actual number of destage TCBs to the maximum number of destage TCBs to provide uniform performance levels across the drive types. In addition, embodiments advantageously provide a mode indicator to allow selection of uniform performance mode. Moreover, embodiments advantageously set the maximum number of stage TCBs to a minimum of the stage maximum values obtained across the drive types and set the maximum number of destage TCBs to a minimum of the destage maximum values obtained across the drive types to ensure that the largest number of stage TCBs and destage TCBs may be used while maintaining uniform performance levels across the drive types.

Example 2: The limitations of any of Examples 1 and 3-7, wherein each of the stage TCBs and the destage TCBs describes a state of a corresponding task.

Embodiments advantageously use a single structure, a TCB, to describe the state of the corresponding task.

Example 3: The limitations of any of Examples 1-2 and 4-7, wherein the program instructions are executable by the processor to cause the processor to perform operations for adding a delay to completion of the stage and to completion of the destage for uniform performance across the drive types. Embodiments advantageously add a delay to the stage completion and to the destage completion to provide uniform performance levels across the drive types.

Example 4: The limitations of any of Examples 1-3 and 5-7, wherein the program instructions are executable by the processor to cause the processor to perform operations for running additional performance benchmarks for each of the arrays to compute an average response time stage value for each of the drive types and, in response to determining that the stage of the first data is near completion, computing the delay as an average response time stage value for a drive type of a drive being used by the stage less a minimum response time stage value, wherein the minimum response time stage value comprises a minimum of the average response time stage values obtained across the drive types. Embodiments advantageously calculate the delay for the stage based on the average response time stage values so that the performance levels of the drive types are uniform.

Example 5: The limitations of any of Examples 1–4 and 6-7, wherein the program instructions are executable by the processor to cause the processor to perform operations for running additional performance benchmarks for each of the arrays to compute an average response time destage value for each of the drive types, and, in response to determining that the destage of the second data is near completion, computing the delay as an average response time destage value for a drive type of a drive being used by the destage less a minimum response time destage value, wherein the minimum response time destage value comprises a minimum of the average response time destage values obtained across the drive types. Embodiments advantageously calculate the delay for the destage based on the average response time destage values so that the performance levels of the drive types are uniform.

Example 6: The limitations of any of Examples 1-5 and 7, wherein the program instructions are executable by the processor to cause the processor to perform operations for at run time, in response to determining that the mode indictor does not indicate the uniform performance mode, setting the maximum number of stage TCBs to a stage maximum optimal value that comprises the stage maximum value obtained for a drive type and setting the maximum number of destage TCBs to a destage maximum optimal value that comprises the destage maximum value obtained for a drive type.

Embodiments advantageously provide a mode indicator to allow selection of an optimal performance mode, in which case the performance levels across the drive types may differ.

Example 7: The limitations of any of Examples 1-6, wherein the program instructions are executable by the processor to cause the processor to perform operations for determining the actual number of stage TCBs and the actual number of destage TCBs based on one or more of: read activity from a host, Non-Volatile Storage (NVS) usage by rank, and overall NVS usage. Embodiments advantageously determine the actual number of stage TCBs and destage TCBs using any combination of read activity from a host, Non-Volatile Storage (NVS) usage by rank, and overall NVS usage.

Example 8: A system comprising one or more processors, one or more computer-readable memories and one or more computer-readable, tangible storage devices; and program instructions, stored on at least one of the one or more computer-readable, tangible storage devices for execution by at least one of the one or more processors via at least one of the one or more computer-readable memories, to perform a method according to any one of Examples 1-7. In this manner, even if the drive types have different performance levels, embodiments advantageously limit the actual number of stage TCBs to the maximum number of stage TCBs and limit the actual number of destage TCBs to the maximum number of destage TCBs to provide uniform performance levels across the drive types. In addition, embodiments advantageously provide a mode indicator to allow selection of uniform performance mode. Moreover, embodiments advantageously set the maximum number of stage TCBs to a minimum of the stage maximum values obtained across the drive types and set the maximum number of destage TCBs to a minimum of the destage maximum values obtained across the drive types to ensure that the largest number of stage TCBs and destage TCBs may be used while maintaining uniform performance levels across the drive types.

Example 9: A computer-implemented method to perform a method according to any of Examples 1-7. In this manner, even if the drive types have different performance levels, embodiments advantageously limit the actual number of stage TCBs to the maximum number of stage TCBs and limit the actual number of destage TCBs to the maximum number of destage TCBs to provide uniform performance levels across the drive types. In addition, embodiments advantageously provide a mode indicator to allow selection of uniform performance mode. Moreover, embodiments advantageously set the maximum number of stage TCBs to a minimum of the stage maximum values obtained across the drive types and set the maximum number of destage TCBs to a minimum of the destage maximum values obtained across the drive types to ensure that the largest number of stage TCBs and destage TCBs may be used while maintaining uniform performance levels across the drive types.

Example 10: The limitations of Examples 1 and 3, which combine setting the maximum number of stage TCBs to a stage maximum uniform value that comprises a minimum of the stage maximum values obtained across the drive types, setting a maximum number of destage TCBs to a destage maximum uniform value that comprises a minimum of the destage maximum values obtained across the drive types, and adding a delay to completion of the stage and to completion of the destage for uniform performance across the drive types. Such a combination advantageously provides both task adjustment (by setting the maximum number of stage TCBs and the maximum number of destage TCBs) and delay to provide uniform performance levels across the drive types.

Example 11: The limitations of Examples 1 and 7, which combine performing a stage of first data using an actual number of stage TCBs that do not exceed the maximum number of stage TCBs and performing a destage of second data using an actual number of destage TCBs that do not exceed the maximum number of destage TCBs, where the actual number of stage TCBs and the actual number of destage TCBs based on one or more of: read activity from a host, Non-Volatile Storage (NVS) usage by rank, and overall NVS usage. Such a combination advantageously enables identifying an actual number of stage TCBs that do not exceed the maximum number of stage TCBs and an actual number of destage TCBs that do not exceed the maximum number of destage TCBs.

FIG. 1 illustrates a storage environment in accordance with certain embodiments. A host 100, which may be one of a plurality of similar hosts, may submit Input/Output (I/O) requests to a storage controller 102 over a network 104 to access data at volumes 106 (e.g., Logical Unit Numbers, Logical Devices, Logical Subsystems, etc.) in a storage 108. The volumes 106 may be stored across a plurality of storage devices 110 in a Redundant Array of Independent Disks (RAID) or Just a Bunch of Disk (JBOD) configuration. Data in the volumes 106 may be organized in extents of data, where an extent comprises a range of tracks in the volume or any other grouping of data in a volume.

The storage controller 102 includes one or more processors 112 and a memory 114, including a cache 116 to cache data for the storage 108. The processors 110 may comprise a separate central processing unit (CPU), one or a group of multiple cores on a single CPU, or a group of processing resources on one or more CPUs. The cache 116 buffers data transferred between the host 100 and volumes 106 in the storage 108.

The memory 112 further includes a storage manager 118 to manage the transfer of tracks between the host 100 and the storage 108 and a cache manager 130 that manages data transferred between host 100 and the storage 108 in the cache 116. A track may comprise any unit of data configured in the storage 108, such as a track, Logical Block Address (LBA), storage cell, group of cells (e.g., column, row or array of cells), sector, segment, etc., which may be part of a larger grouping of tracks, such as a volume, logical device, etc. An extent may comprise any grouping of tracks.

In certain implementations, the storage manager 118 includes a task manager 122, performance values 124, and a mode indicator 126. The task manager 122 adjusts tasks for uniform performance across drives. The task manager 122 uses the performance values 124 to adjust task completion by determining whether to add a delay to completion of the tasks (i.e., the stage and destage tasks). The mode indicator 126 has a first value (e.g., "on" or "1") to indicate that uniform performance mode is selected and a second value (e.g., "off" or "0") to indicate that uniform performance mode is not selected (i.e., an optimal performance mode). In certain embodiments, the uniform performance mode being selected is the default mode.

The memory 114 may comprise a suitable volatile or non-volatile memory devices, such as non-volatile storage 132.

In certain embodiments, the storage controller 102 may comprise an enterprise storage controller, such as the International Business Machines Corporation (IBM®) DS8000™ storage controller or storage controllers from other vendors. The host 100 may comprise an enterprise host system that includes an operating system such as, but not limited to, the IBM® Z/OS® operating system. (IBM, Z/OS and DS800 are registered trademarks of IBM throughout the world).

The storage manager 118, cache manager 130, and task manager 122 may comprise program code loaded into the memory 114 and executed by one or more of the processors 112. Alternatively, some or all of the functions may be implemented as microcode or firmware in hardware devices in the storage controller 102, such as in Application Specific Integrated Circuits (ASICs) and Field Programmable Gate Array (FPGA).

The storage 108 may comprise one or more storage devices 110, such as a solid state storage device (SSD) comprised of solid state electronics, NAND storage cells, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices 110 may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The network 104 may comprise a Storage Area Network (SAN), a Local Area Network (LAN), a Wide Area Network (WAN), the Internet, and Intranet, etc.

In certain embodiments, the storage devices 108 are flash and/or disk drives from various vendors. The vendors certify that the drives will operate at a particular performance level.

During a drive qualification process, drives from several drive vendors are qualified to run at a minimum performance level. A storage drive may be qualified to run at 1) sequential write throughput of 10 GigaBytes (GB/s), 2) random write throughput of 2 GB, 3) sequential read throughput of 12 GB/s, 4) random read throughput of 4 GB, etc.

Drive qualification determines whether the performance level of the drive is at least the level at which the drive is certified by the vendor. Some drives from vendors may provide additional performance (i.e., a higher performance level) for some of the workloads, even though these drives are certified at the same performance level.

For example, assume Drive X is from Vendor A and Drive Y is from vendor B. If drive X provides performance higher than the certified levels for a workload, and Drive Y provides performance at the certified level for that workload, then there may be an issue in the field with replacing Drive X with Drive Y. Continuing with the example, if Drive X is replaced with Drive Y, then the performance may go down, even though Drive Y is performing at the certified level. Thus, if a customer replaced the drives from one vendor to another vendor, the performance level may go down even though the drives from both vendors were certified at the same performance level. The task manager 122 makes sure that the drives certified at the same performance level perform uniformly across the vendors.

In addition, the host 100 may issue requests to store and/or retrieve data from the volumes 106. The storage manager 118 handles staging of data ("stage"), which writes data from the storage devices 110 to the cache 116. In addition, the storage manager 118 handles destaging of data ("destage"), which writes data from cache 116 to the storage devices 110. The stage and destage are allocated tasks with TCBs, where each TCB describes the state of a corresponding task.

In certain embodiments, during drive qualification, the task manager 122 ensures that that the drives certified at the same performance level provide uniform performance. In certain embodiments, the task manager 122 reduces the performance level of the drives that perform better than the certification level by reducing the number of tasks used for stage/destage and adding a latency for response times. In certain embodiments, the task manager 122 provides the mode indicator 126 (e.g., an optional switch) to obtain the maximum performance from drives without adherence to certification level.

FIG. 2 illustrates performance data 124 in accordance with certain embodiments. The performance data 124 includes values 210, 212, 214, 216, 218, 220 for a stage and includes values 230, 232, 234, 236, 238, and 240 for a destage. The stage maximum (StageMax) values 210 may be described as a maximum number of stage TCBs allocated for the stage for each drive type. The average response time stage (AverageResponseTimeStage) values 212 may be described as the average response time in writing data from a storage device 110 to the cache 116 for each drive type. The stage maximum optimal (StageMaxOptimal) value 214 may be set to the StageMax value 210. The stage maximum uniform (StageMaxUniform) 216 value may be set to a minimum of the StageMax values 210. The minimum response time stage (MinResponseTimeStage) value 218 may be set to a minimum of the average response time stage (AverageResponseTimeStage) values 212. The delta response time stage (DeltaResponseTimeStage) value 220 may be described as a delay for the stage.

The destage maximum (DestageMax) values 230 may be described as a maximum number of TCPs allocated to the destage for each drive type. The average response time destage (AverageResponseTimeDestage) values 232 may be described as the average response time for writing data from the cache 116 to a storage device 110 for each drive type. The destage maximum optimal (DestageMaxOptimal) value 234 may be set to the DestageMax value 230. The destage maximum uniform (DestageMaxUniform) value 236 may be set to a minimum of the DestageMax values 230. The minimum response time destage (MinResponseTimeDestage) value 238 may be set to a minimum of the AverageResponseTimeDestage values 232. The delta response time destage (DeltaResponseTimeDestage) value 240 may be described as a delay for the destage.

In certain embodiments, the storage manager 118 allocates stage TCBs for stage and destage TCBs for destage based on the RAID array or rank type. The stage TCBs for stage go from a minimum of zero to a maximum (StageMax) based on number of read requests from the host 100 on a rank. The destage TCBs for destage go from a minimum of zero to a maximum DestageMax based on NVS 132 usage for the rank and overall NVS 132 usage. A rank may be described as one or more arrays that are combined to create a logically contiguous storage space.

In certain embodiments, the task manager 122 computes StageMax and DestageMax by running benchmark tests on the rank. For example, for a rank composed of certain drive types, the StageMax of 160 might provide peak performance for reads and the DestageMax of 160 may provide peak performance for writes. The benchmark tests may be: database operations, SPC-2 (TM), random reads, random writes, sequential reads, sequential writes, various combinations of reads/writes, etc., (SPC Benchmark is a registered trademark of the Storage Performance Council)

Figure 3A:
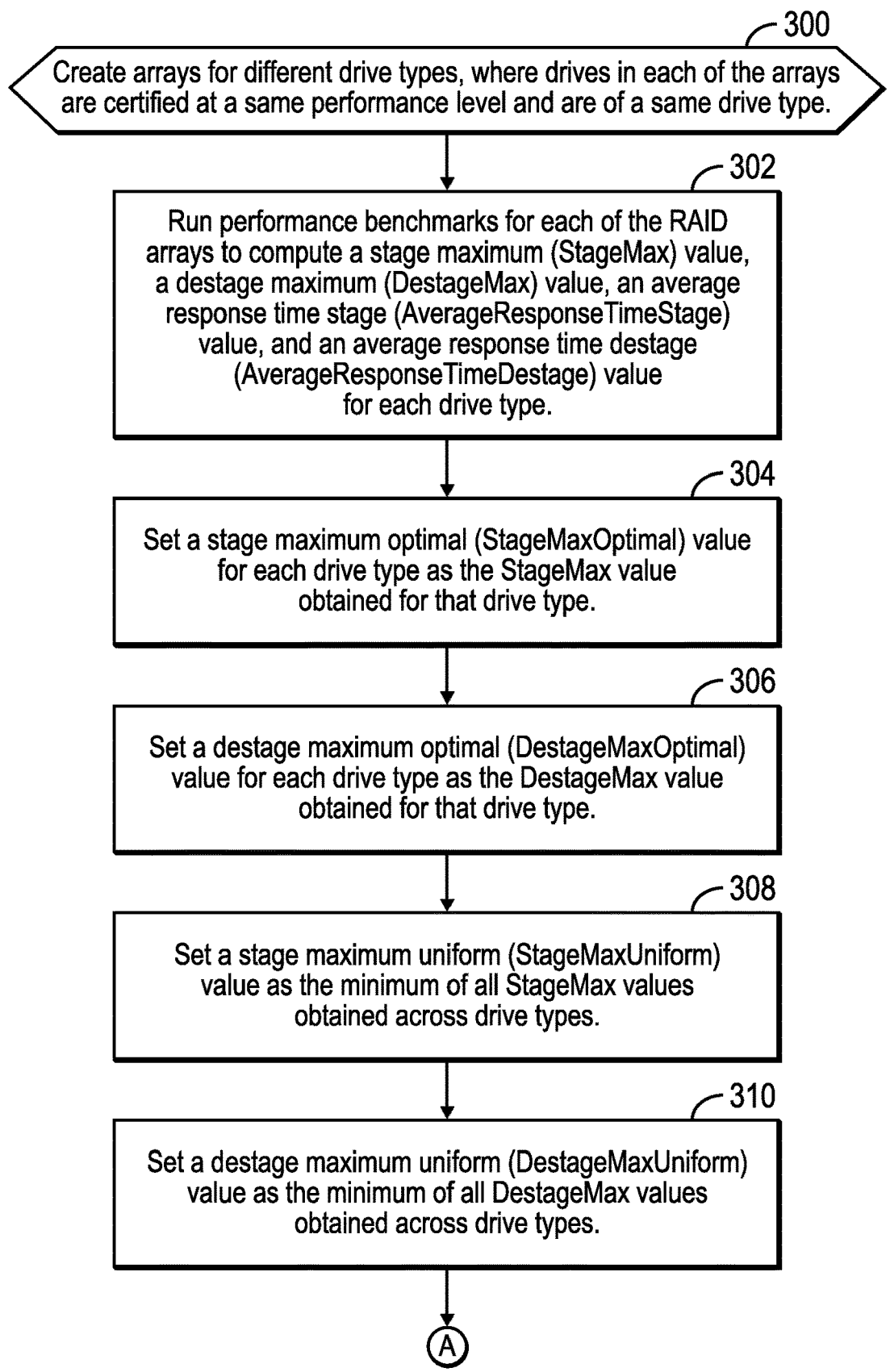
FIGS. 3A and 3B illustrate, in a flowchart, operations for generating the performance values in accordance with certain embodiments.
Figure 3B:
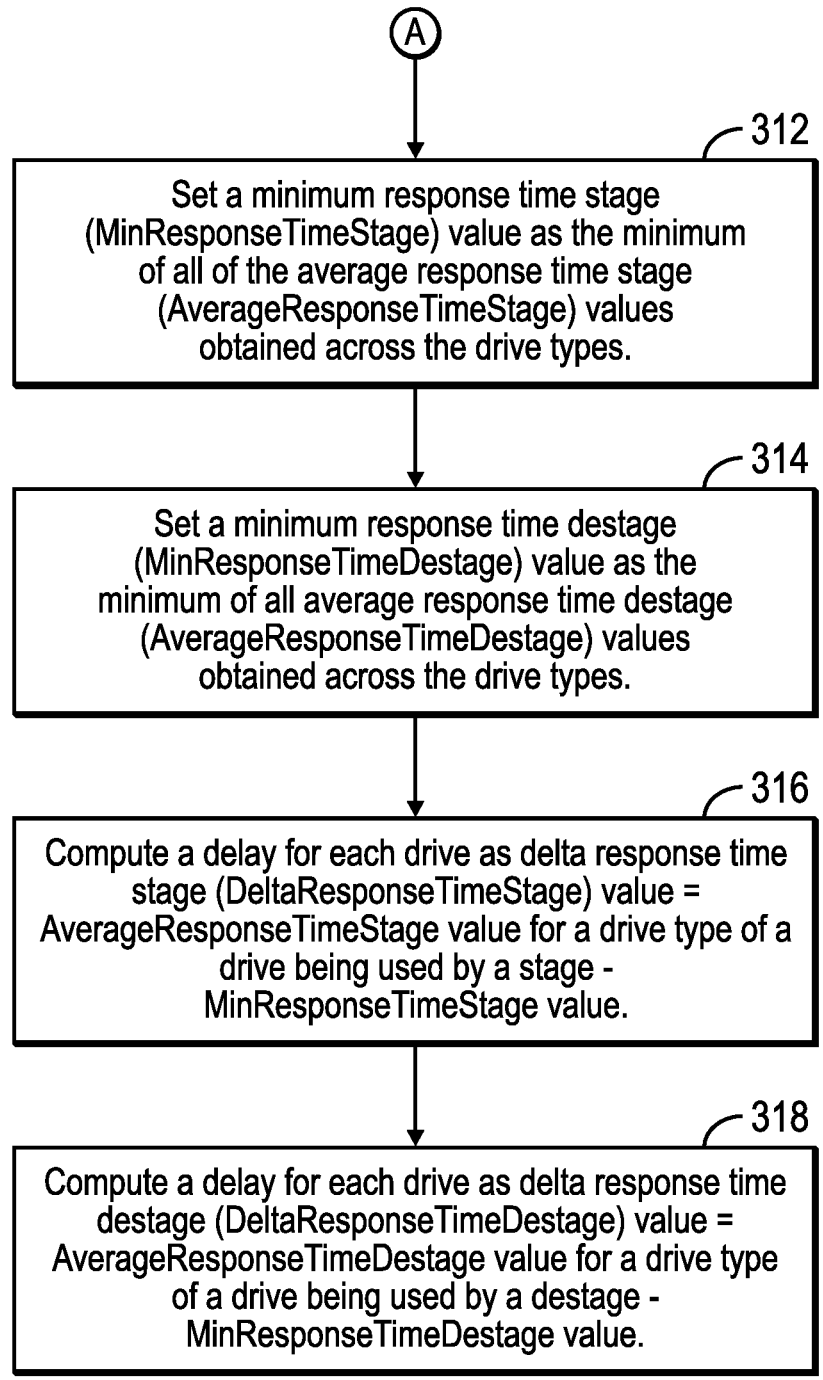

FIGS. 3A and 3B illustrate, in a flowchart, operations for generating the performance values in accordance with certain embodiments. Control begins at block 300 with the task manager 122 creating arrays of drives for different drive types, where drives in each of the arrays are certified at a same performance level and are of a same drive type. In certain embodiments, the arrays are RAID arrays. For example, the task manager 122 creates a first RAID array of drive type X from Vendor A, a second RAID array of drive type Y from vendor B, etc.

In block 302, the task manager 122 runs performance benchmarks for each of the RAID arrays to compute a stage maximum (StageMax) value, a destage maximum (DestageMax) value, an average response time stage (AverageResponseTimeStage) value, and an average response time destage (AverageResponseTimeDestage) value for each drive type.

In block 304, the task manager 122 sets a stage maximum optimal (StageMaxOptimal) value for each drive type as the StageMax value obtained for that drive type. In block 306, the task manager 122 sets a destage maximum optimal (DestageMaxOptimal) value for each drive type as the DestageMax value obtained for that drive type.

In block 308, the task manager 122 sets a stage maximum uniform (StageMaxUniform) value as the minimum of all StageMax values obtained across the drive types. In block 310, the task manager 122 sets a destage maximum uniform (DestageMaxUniform) value as the minimum of all DestageMax values obtained across the drive types. From block 310 (FIG. 3A), processing continues to block 312 (FIG. 3B).

In block 312, the task manager 122 sets a minimum response time stage (MinResponseTimeStage) value as the minimum of all of the average response time stage (AverageResponseTimeStage) values obtained across the drive types. In block 314, the task manager 122 sets a minimum response time destage (MinResponseTimeDestage) value as the minimum of all average response time destage (AverageResponseTimeDestage) values obtained across the drive types.

In block 316, the task manager 122 computes a delay for each drive as delta response time stage (DeltaResponseTimeStage) value=AverageResponseTimeStage value for the drive type of a drive being used by the stage–MinResponseTimeStage value.

In block 318, the task manager 122 computes a delay for each drive as delta response time destage (DeltaResponseTimeDestage) value=AverageResponseTimeDestage value for a drive type of a drive being used by the destage–MinResponseTimeDestage value.

Figure 4:
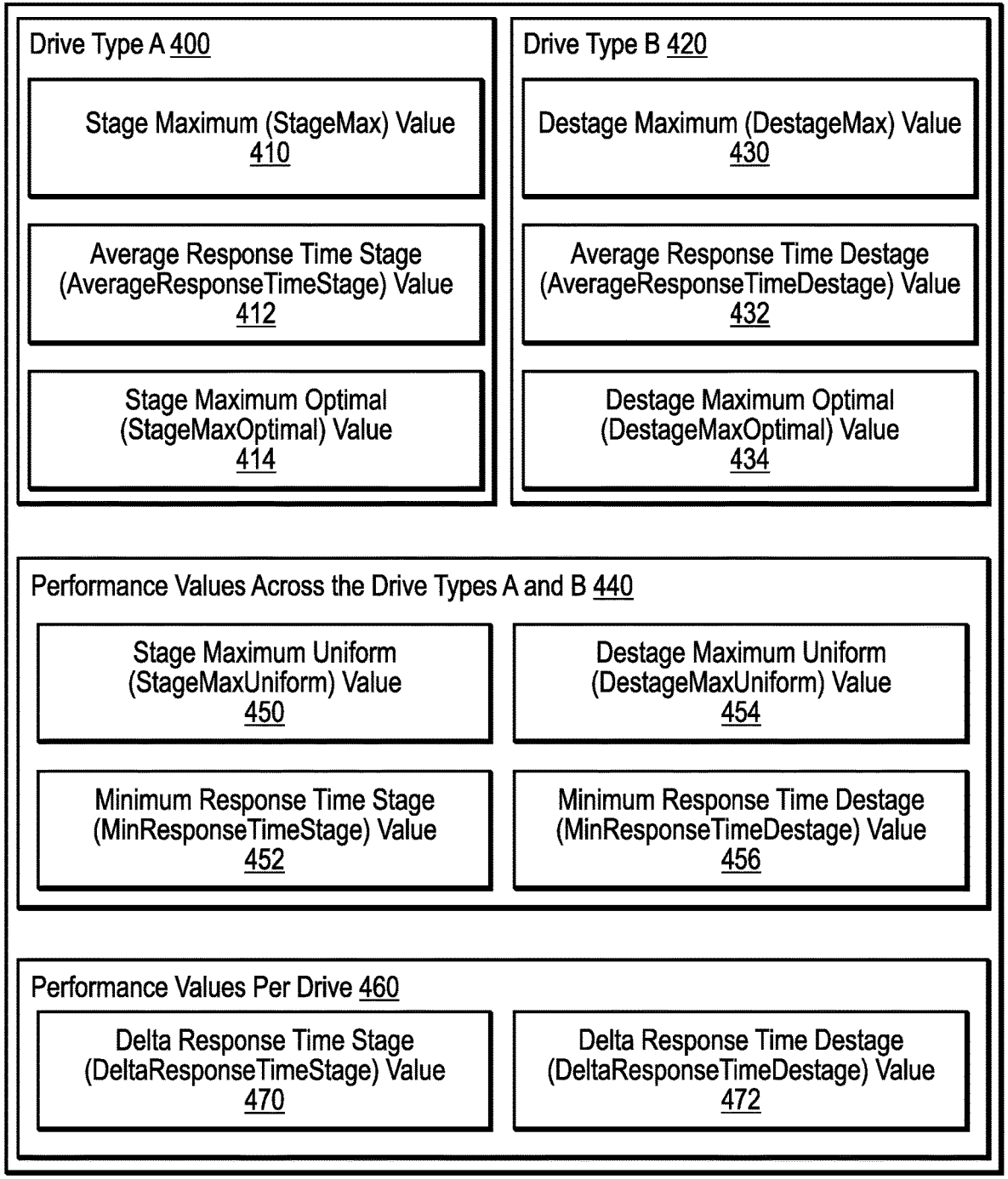
FIG. 4 illustrates an example of performance values specific to drive types and across drive types in accordance with certain embodiments.

FIG. 4 illustrates an example of performance values specific to drive types and across drive types in accordance with certain embodiments. In this example, Drive Type A 400 has performance values of StageMax 410, AverageResponseTimeStage 412, and StageMaxOptimal 414. Continuing with the example, Drive Type B 420 has performance values of DestageMax 430, AverageResponseTimeDestage 432, and DestageMaxOptimal 434. Also, across both drive types A and B, there are performance values 440 of StageMaxUniform 450, MinResponseTimeStage 452, DestageMaxUniform 454, and MinResponseTimeDestage 456. In addition, performance values per drive 460 are: DeltaResponseTimeStage 470 and DeltaResponseTimeDestage 472.

Figure 5:
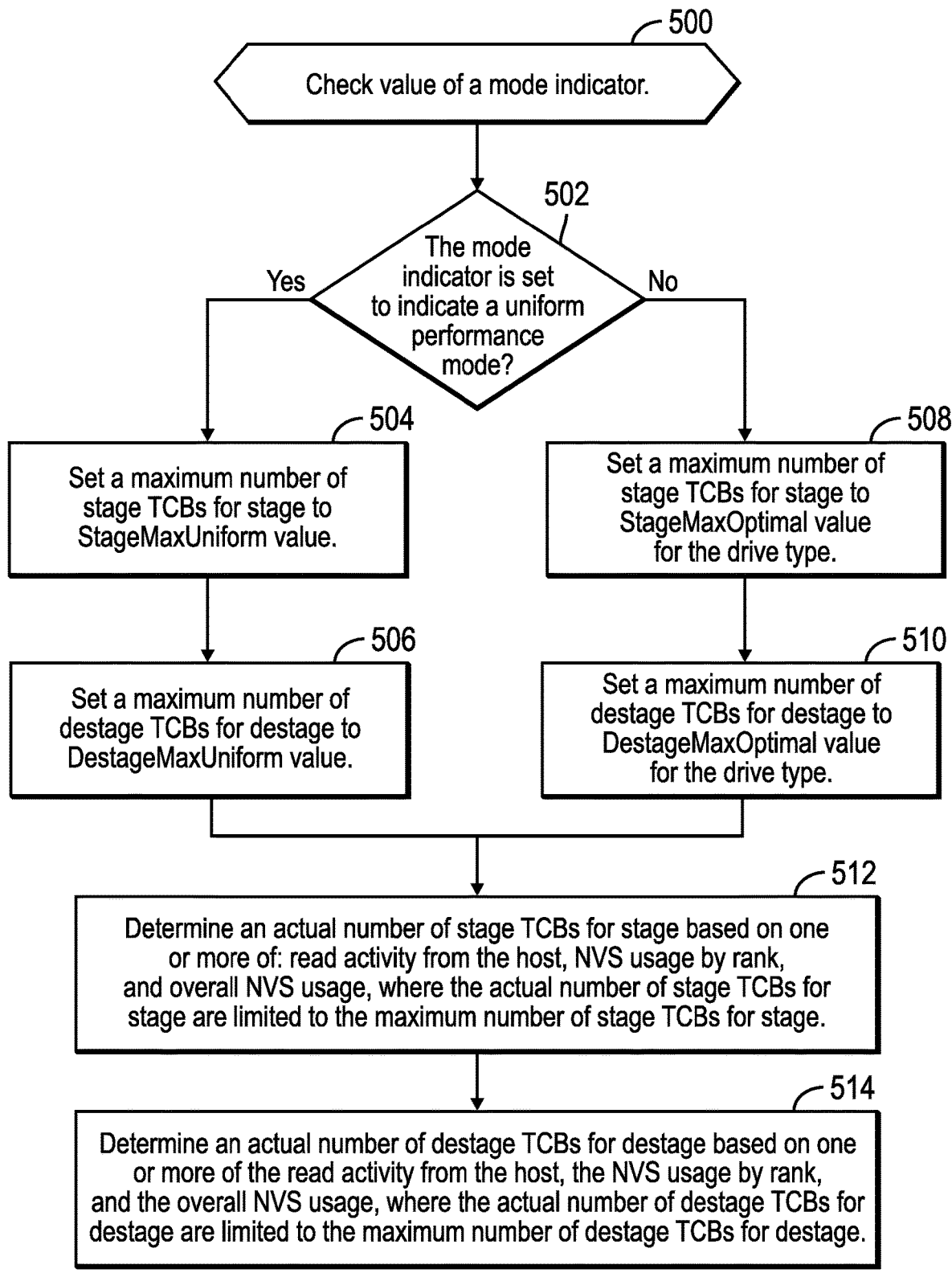
FIG. 5 illustrates, in a flowchart, operations, at run time, for determining a number of stage TCBs and destage TCBs in accordance with certain embodiments.

FIG. 5 illustrates, in a flowchart, operations, at run time (e.g., during performance measurements), for determining a number of stage TCBs and destage TCBs in accordance with certain embodiments. Control begins at block 500 with the task manager 122 checking the value of the mode indicator 126. In block 502, if the task manager determines that the mode indicator 126 is set to indicate a uniform performance mode, processing continues to block 504, otherwise, processing continues to block 508.

In block 504, the task manager 122 sets a maximum number of stage TCBs for stage to the StageMaxUniform value. Since the StageMaxUniform value is set to a minimum of the StageMax values across drive types, this ensures uniform performance levels across drive types for stage.

In block 506, the task manager 122 sets a maximum number of destage TCBs for destage to the DestageMaxUniform value. Since the DestageMaxUniform value is set to the minimum of all DestageMax values across the drive types, this ensures uniform performance levels across drive types for destage.

In block 508, the task manager 122 sets a maximum number of stage TCBs for stage to the StageMaxOptimal value for the drive type (e.g., in the RAID array). In block 510, the task manager 122 sets a maximum number of destage TCBs for destage to the DestageMaxOptimal value for the drive type (e.g., in the RAID array).

In block 512, the task manager 122 determines an actual number of stage TCBs for stage based on one or more of read activity from the host, NVS usage by the rank, and overall NVS usage, where the actual number of stage TCBs for stage are limited to the maximum number of stage TCBs for stage.

In block 514, the task manager 122 determines an actual number of destage TCBs for destage based on one or more of the read activity from the host, the NVS usage by rank, and the overall NVS usage, where the actual number of destage TCBs for destage are limited to the maximum number of destage TCBs for destage. That is, once the maximum number of stage TCBs and destage TCBs are set, the task manager 122 determines an actual number of stage TCBs and destage TCBs, which are respectively limited to the maximum number of stage TCBs and destage TCBs.

FIGS. 6A and 6B illustrate computing an actual number of stage TCBs and destage TCBs in accordance with certain embodiments. Block 610 illustrates a computation of an actual number of stage TCBs for stage based on the queue size of the TCBs waiting for stage TCBs. Block 620 illustrates a computation of an actual number of destage TCBs for destage based on NVS usage by rank.

Figure 7:
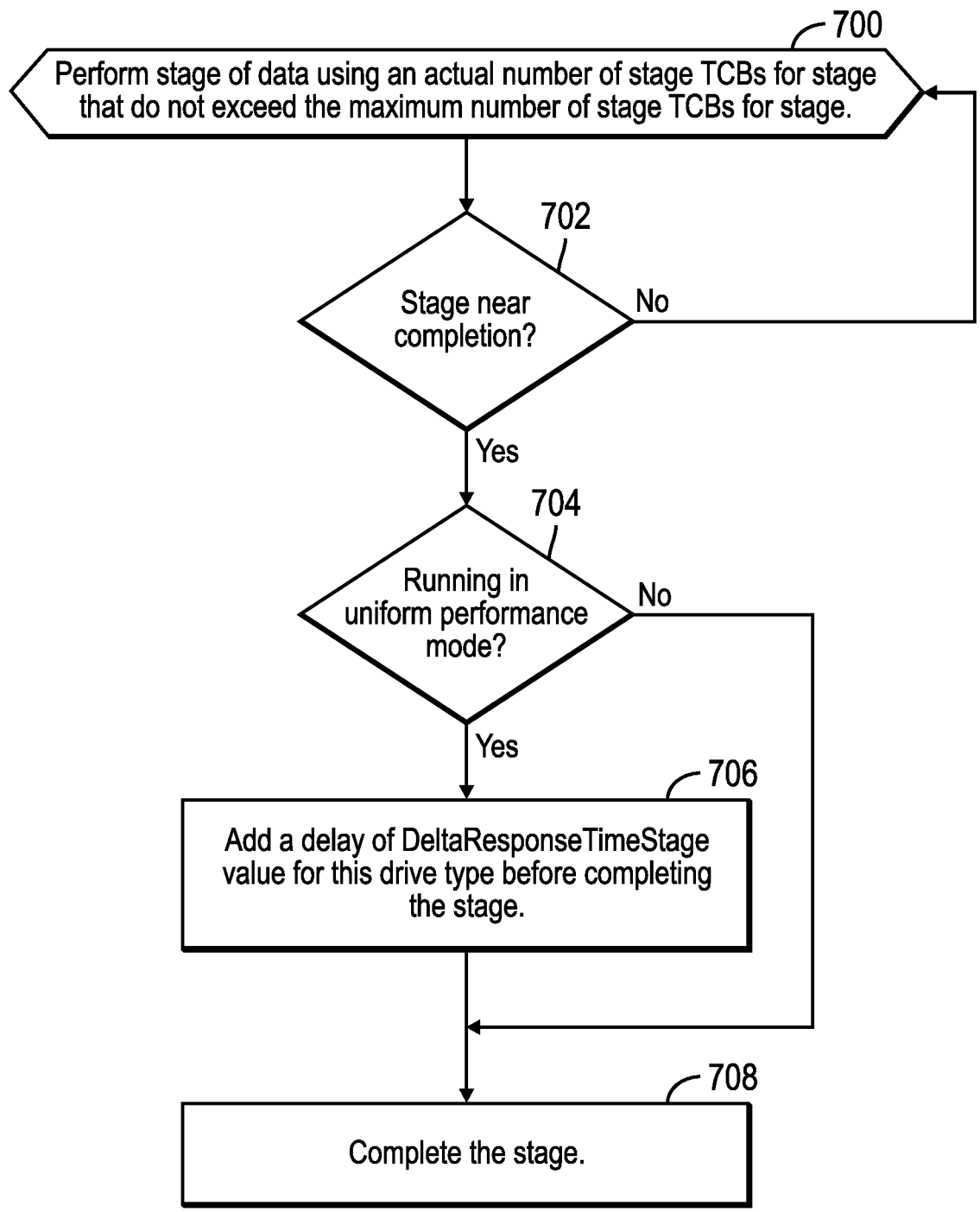
FIG. 7 illustrates, in a flowchart, operations for stage while running in uniform performance mode in accordance with certain embodiments.

In certain embodiments, if running in uniform performance mode, then the task manager 122 adds a delay of the DeltaResponseTimeStage value for this drive type before completing the stage. FIG. 7 illustrates, in a flowchart, operations for stage while running in uniform performance mode in accordance with certain embodiments. Control begins at block 700 with the task manager 122 performing stage of data. In block 702, the task manager 122 determines whether the stage is near completion. If so, processing continues to block 704, otherwise, processing loops back to block 700.

In block 704, the task manager 122 determines whether the stage is running in uniform performance mode. If so, processing continues to block 706, otherwise, processing continues to block 708.

In block 706, the task manager 122 adds a delay of the DeltaResponseTimeStage value for this drive type before completing the stage. In certain embodiments, the task manager 122 delays completing the stage based on the DeltaResponseTimeStage value. In certain embodiments, the delay may be performed by putting the stage TCB for the stage on a timer queue for a delay time (e.g., 100 microsecs). In block 708, the task manager 122 completes the stage.

Figure 8:
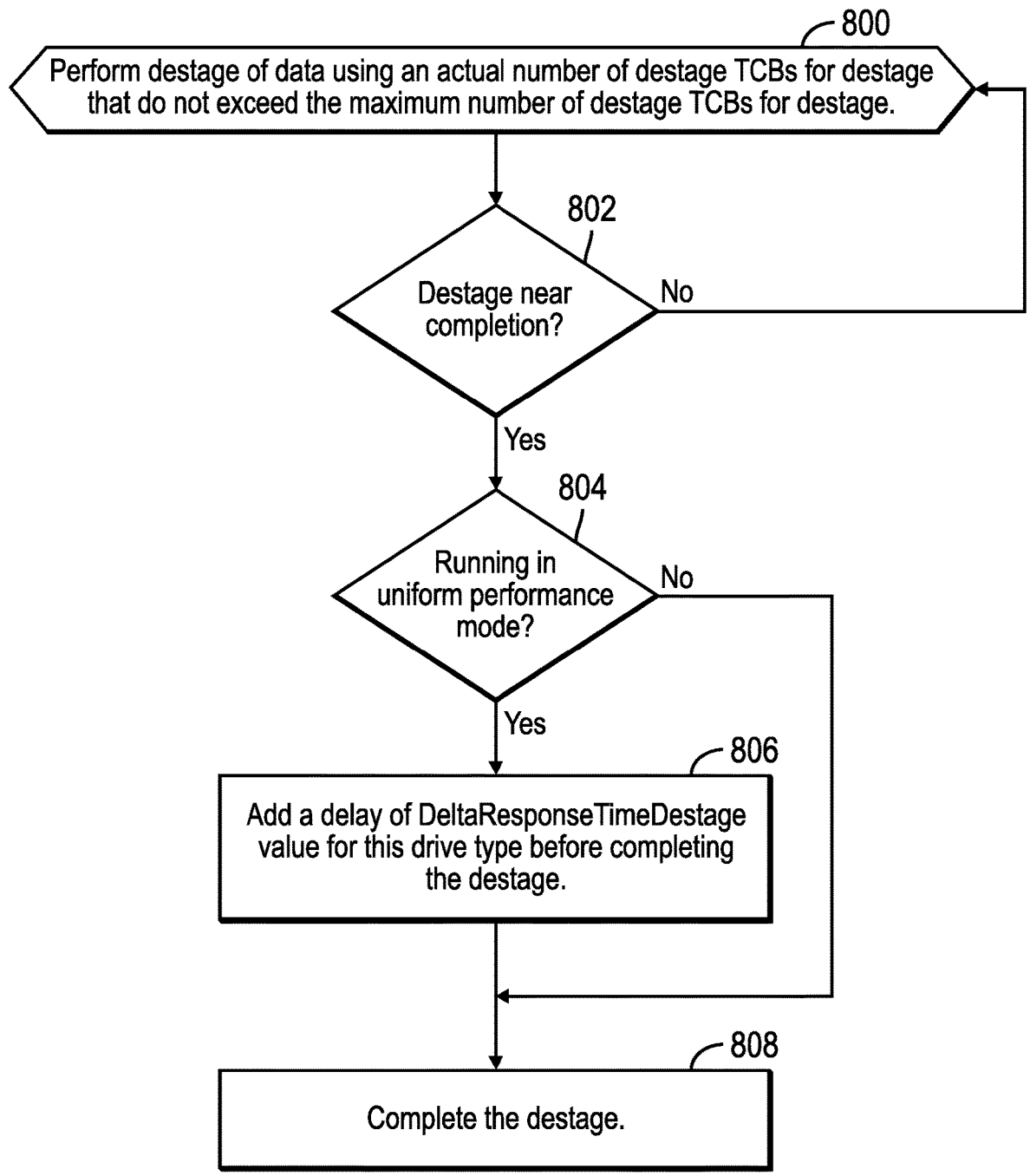
FIG. 8 illustrates, in a flowchart, operations for stage while running in uniform performance mode in accordance with certain embodiments.

In certain embodiments, if running in uniform performance mode, then the task manager 122 adds a delay of the DeltaResponseTimeDestage value for this drive type before completing the destage. FIG. 8 illustrates, in a flowchart, operations for stage while running in uniform performance mode in accordance with certain embodiments. Control begins at block 800 with the task manager 122 performing destage of data. In block 802, the task manager 122 determines whether the destage is near completion. If so, processing continues to block 804, otherwise processing loops back to block 800.

In block 804, the task manager 122 determines whether the destage is running in uniform performance mode. If so, processing continues to block 806, otherwise, processing continues to block 808.

In block 806, the task manager 122 adds a delay of the DeltaResponseTimeDestage value for this drive type before completing the destage. In certain embodiments, the task manager 122 delays completing the stage based on the DeltaResponseTimeDestage value. In certain embodiments, the delay may be performed by putting the destage TCB for the destage on a timer queue for a delay time (e.g., 100 microsecs). In block 808, the task manager 122 completes the destage.

In various embodiments, the task adjustment for uniform performance may be generalized to other areas, such as sync Input/Output (I/O).

Figure 9:
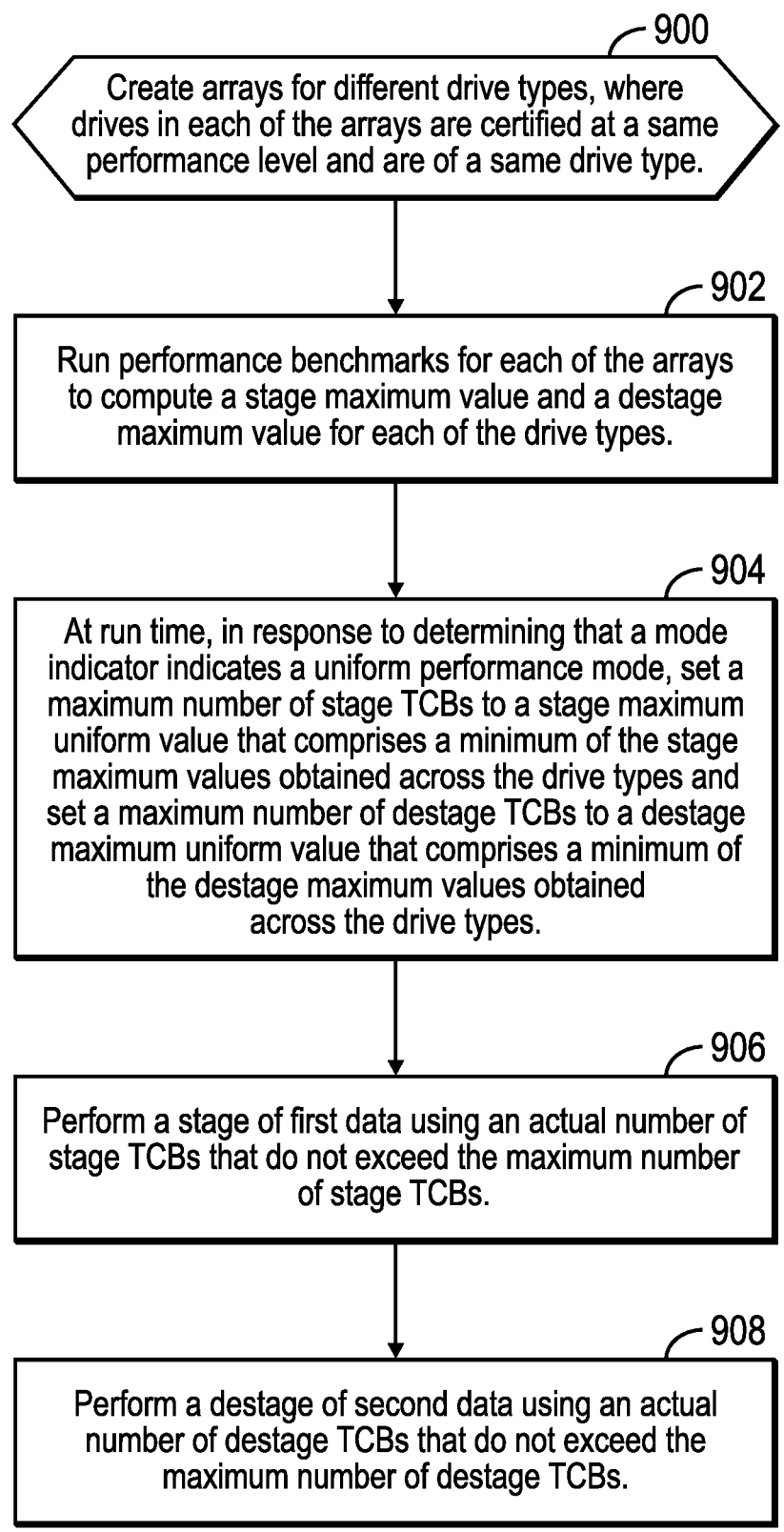
FIG. 9 illustrates, in a flowchart, operations for task adjustment for uniform performance of drives in accordance with certain embodiments.

FIG. 9 illustrates, in a flowchart, operations for task adjustment for uniform performance of drives in accordance with certain embodiments. Control begins at block 900 with the task manager 122 creating arrays for different drive types, where drives in each of the arrays are certified at a same performance level and are of a same drive type. In block 902, the task manager 122 runs performance benchmarks for each of the arrays to compute a stage maximum value and a destage maximum value for each of the drive types.

In block 904, at run time, in response to determining that a mode indictor indicates a uniform performance mode, the task manager 122 sets a maximum number of stage TCBs to a stage maximum uniform value that comprises a minimum of the stage maximum values obtained across the drive types and sets a maximum number of destage TCBs to a destage maximum uniform value that comprises a minimum of the destage maximum values obtained across the drive types.

In block 906, the task manager 122 performs a stage of first data using an actual number of stage TCBs that do not exceed the maximum number of stage TCBs. That is, the stage uses an actual number of stage TCBs that are equal to or less than the maximum number of stage TCBs (i.e., no more than the maximum number of stage TCBs).

In block 908, the task manager 122 performs a destage of second data using an actual number of destage TCBs that do not exceed the maximum number of destage TCBs. That is, the destage uses an actual number of destage TCBs that are equal to or less than the maximum number of destage TCBs (i.e., no more than the maximum number of destage TCBs).

In various embodiments, the first data (block 906) and the second data (block 908) may be different data, may be the same data (that is staged and destaged) or may have some of the same data and some different data.

In certain embodiments, the task manager 122 adds a delay to completion of the stage and to completion of the destage for uniform performance across the drive types.

In certain embodiments, the task manager 122 runs additional performance benchmarks for each of the arrays to compute an average response time stage value for each of the drive types and, in response to determining that the stage of the first data is near completion, computes the delay as an average response time stage value for a drive type of a drive being used by the stage less a minimum response time stage value, where the minimum response time stage value comprises a minimum of the average response time stage values obtained across the drive types.

In certain embodiments, the task manager 122 runs additional performance benchmarks for each of the arrays to compute an average response time destage value for each of the drive types, and, in response to determining that the destage of the second data is near completion, computes the delay as an average response time destage value for a drive type of a drive being used by the destage less a minimum response time destage value, where the minimum response time destage value comprises a minimum of the average response time destage values obtained across the drive types.

In certain embodiments, the task manager 122 provides task adjustment for uniform performance for drive qualification by creating RAID arrays for various drives certified for the same performance level. At run time, the task manager 122 performs TCB computation. In particular, if running in uniform performance mode, the task manager 122 sets the maximum stage TCBs for stage to the StageMaxUniform value and sets the maximum destage TCBs for destage to the DestageMaxUniform value. On the other hand, if not running in default mode, the task manager sets the maximum stage TCBs for stage to the StageMaxOptimal value for the drive type in the RAID array and sets the maximum destage TCBs for destage to the DestageMaxOptimal value for the drive type in the RAID array.

In certain embodiments, once the maximum stage TCBs and maximum destage TCBs are set, the task manager 122 determines the actual number of stage TCBs and destage TCBs based on any combination of: read activity from the host, the NVS usage by the rank, and the overall NVS usage.

If running in uniform performance mode, then on stage completion, the task manager 122 adds a delay of the DeltaResponseTimeStage value for this drive type before completing the stage. If running in uniform performance mode, then on destage completion, the task manager 122 adds a delay of the DeltaResponseTimeDestage value for this drive type before completing the destage.

In certain embodiments, the task manager 122 may include or use a machine learning model to output performance values for uniform performance of the StageMaxUniform value, the DestageMaxUniform value, the DeltaResponseTimeStage value, and the DeltaResponseTimeDestage value using inputs of the StageMax value, the DestageMax value, the AverageResponseTimeStage value, and the AverageResponseTimeDestage value for each drive type.

The task manager 122 may use machine learning and deep learning algorithms, such as decision tree learning, association rule learning, neural network, inductive programming logic, support vector machines, Bayesian network, Recurrent Neural Networks (RNN), Feedforward Neural Networks, Convolutional Neural Networks (CNN), Deep Convolutional Neural Networks (DCNNs), Generative Adversarial Network (GAN), etc. For artificial neural network program implementations, the neural network may be trained to generate performance values for uniform performance using backward propagation to adjust weights and biases at nodes in a hidden layer to produce their output based on the received inputs. In backward propagation used to train a neural network machine learning module, biases at nodes in the hidden layer are adjusted accordingly to produce the performance values for uniform performance. Backward propagation may comprise an algorithm for supervised learning of artificial neural networks using gradient descent. Given an artificial neural network and an error function, the method may use gradient descent to find the parameters (coefficients) for the nodes in a neural network or function that minimizes a cost function measuring the difference or error between actual and predicted values for different parameters. The parameters are continually adjusted during gradient descent to minimize the error.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1000 of contains an example of an environment for the execution of at least some of the computer code involved in performing the inventive methods, such as the task manager 122 in block 1100. In addition to block 1100, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1100, as identified above), peripheral device set 1014 (including user interface (UI) device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

Figure 10:
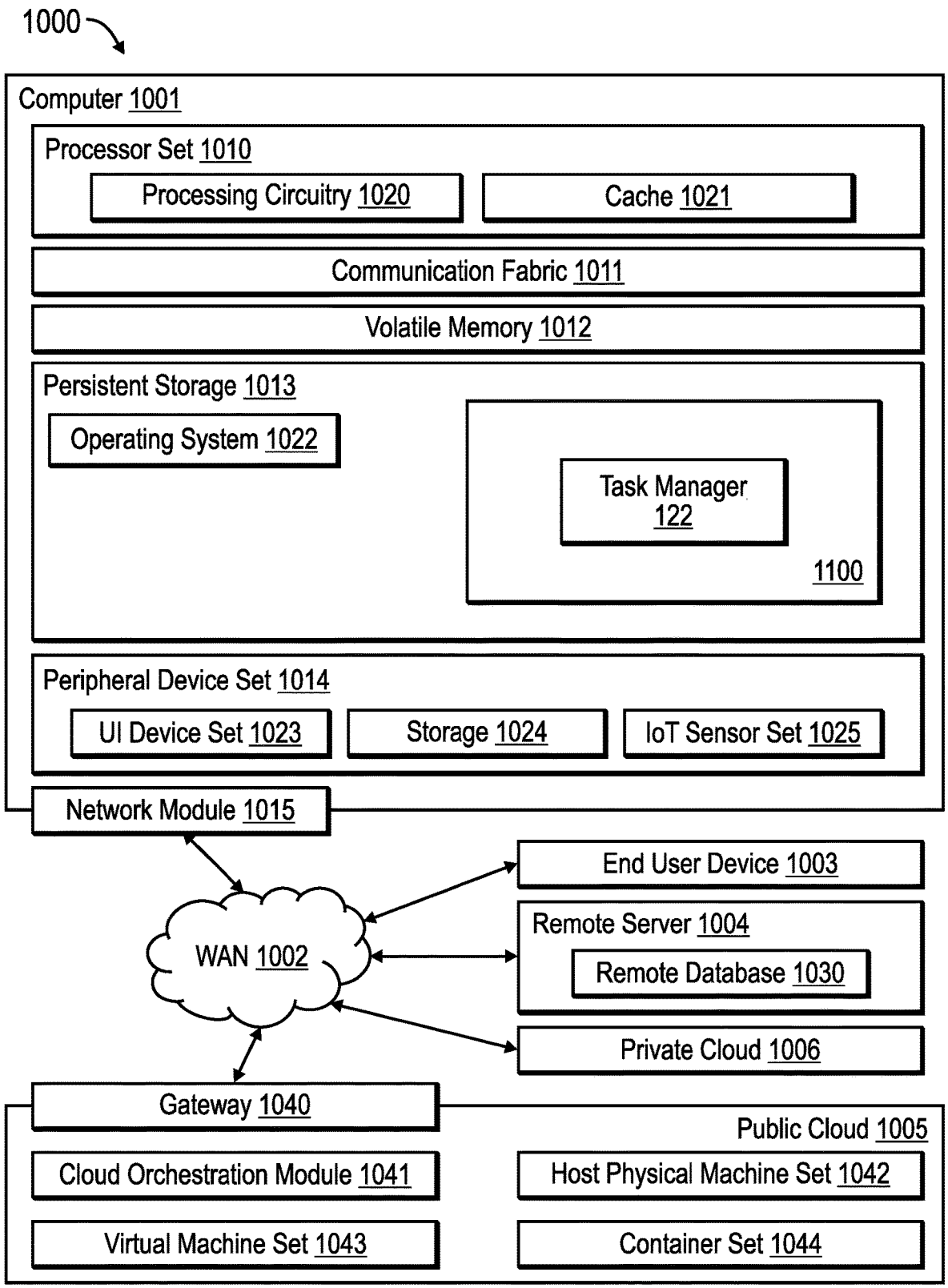
FIG. 10 illustrates a computing environment in which the components of FIG. 1 may be implemented.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in block 1100 in persistent storage 1013.

COMMUNICATION FABRIC 1011 is the signal conduction path that allows the various components of computer 1001 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, volatile memory 1012 is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid state storage devices. Operating system 1022 may take several forms, such as various known proprietary operating systems or open source Portable Operating System Interface-type operating systems that employ a kernel. The code included in block 1100 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

REMOTE SERVER 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

The letter designators, such as i, among others, are used to designate an instance of an element, i.e., a given element, or a variable number of instances of that element when used with the same or different elements.

The terms "an embodiment", "embodiment", "embodiments", "the embodiment". "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product, the computer program product comprising a computer readable storage medium having program instructions embodied therewith, the program instructions executable by a processor to cause the processor to perform operations for:
    creating arrays for different drive types, wherein drives in each of the arrays are certified at a same performance level and are of a same drive type;
    running performance benchmarks for each of the arrays to compute a stage maximum value and a destage maximum value for each of the drive types;
    at run time, in response to determining that a mode indictor indicates a uniform performance mode,
        setting a maximum number of stage Task Control Blocks (TCBs) to a stage maximum uniform value that comprises a minimum of the stage maximum values obtained across the drive types;
        setting a maximum number of destage TCBs to a destage maximum uniform value that comprises a minimum of the destage maximum values obtained across the drive types; and
        adding a first delay to completion of a stage and a second delay to completion of a destage for uniform performance across the drive types;
    performing the stage of first data using an actual number of stage TCBs that do not exceed the maximum number of stage TCBs and based on the first delay; and
    performing the destage of second data using an actual number of destage TCBs that do not exceed the maximum number of destage TCBs and based on the second delay.

2. The computer program product of claim 1, wherein each of the stage TCBs and the destage TCBs describes a state of a corresponding task.

3. The computer program product of claim 1, wherein the program instructions are executable by the processor to cause the processor to perform further operations for:
    running additional performance benchmarks for each of the arrays to compute an average response time stage value for each of the drive types; and
    in response to determining that the stage of the first data is near completion, computing the first delay as an average response time stage value for a drive type of a drive being used by the stage less a minimum response time stage value, wherein the minimum response time stage value comprises a minimum of the average response time stage values obtained across the drive types.

4. The computer program product of claim 1, wherein the program instructions are executable by the processor to cause the processor to perform further operations for:
    running additional performance benchmarks for each of the arrays to compute an average response time destage value for each of the drive types; and
    in response to determining that the destage of the second data is near completion, computing the second delay as an average response time destage value for a drive type of a drive being used by the destage less a minimum response time destage value, wherein the minimum response time destage value comprises a minimum of the average response time destage values obtained across the drive types.

5. The computer program product of claim 1, wherein the program instructions are executable by the processor to cause the processor to perform further operations for:
    at the run time, in response to determining that the mode indictor does not indicate the uniform performance mode,
        setting the maximum number of stage TCBs to a stage maximum optimal value that comprises the stage maximum value obtained for a drive type; and
        setting the maximum number of destage TCBs to a destage maximum optimal value that comprises the destage maximum value obtained for a drive type.

6. The computer program product of claim 1, wherein the program instructions are executable by the processor to cause the processor to perform further operations for:
    determining the actual number of stage TCBs and the actual number of destage TCBs based on one or more of: read activity from a host, Non-Volatile Storage (NVS) usage by rank, and overall NVS usage.

7. A system, comprising:
    one or more processors, one or more computer-readable memories and one or more computer-readable, tangible storage devices; and
    program instructions, stored on at least one of the one or more computer-readable, tangible storage devices for execution by at least one of the one or more processors via at least one of the one or more computer-readable memories, to perform operations comprising:
    creating arrays for different drive types, wherein drives in each of the arrays are certified at a same performance level and are of a same drive type;
    running performance benchmarks for each of the arrays to compute a stage maximum value and a destage maximum value for each of the drive types;
    at run time, in response to determining that a mode indictor indicates a uniform performance mode, setting a maximum number of stage Task Control Blocks (TCBs) to a stage maximum uniform value that comprises a minimum of the stage maximum values obtained across the drive types;

setting a maximum number of destage TCBs to a destage maximum uniform value that comprises a minimum of the destage maximum values obtained across the drive types; and adding a first delay to completion of a stage and a second delay to completion of a destage for uniform performance across the drive types;

performing the stage of first data using an actual number of stage TCBs that do not exceed the maximum number of stage TCBs and based on the first delay; and performing the destage of second data using an actual number of destage TCBs that do not exceed the maximum number of destage TCBs and based on the second delay.

8. The system of claim 7, wherein each of the stage TCBs and the destage TCBs describes a state of a corresponding task.

9. The system of claim 7, wherein the program instructions further perform operations comprising:

running additional performance benchmarks for each of the arrays to compute an average response time stage value for each of the drive types; and in response to determining that the stage of the first data is near completion, computing the first delay as an average response time stage value for a drive type of a drive being used by the stage less a minimum response time stage value, wherein the minimum response time stage value comprises a minimum of the average response time stage values obtained across the drive types.

10. The system of claim 7, wherein the program instructions further perform operations comprising:

running additional performance benchmarks for each of the arrays to compute an average response time destage value for each of the drive types; and in response to determining that the destage of the second data is near completion, computing the second delay as an average response time destage value for a drive type of a drive being used by the destage less a minimum response time destage value, wherein the minimum response time destage value comprises a minimum of the average response time destage values obtained across the drive types.

11. The system of claim 7, wherein the program instructions further perform operations comprising:

at the run time, in response to determining that the mode indictor does not indicate the uniform performance mode, setting the maximum number of stage TCBs to a stage maximum optimal value that comprises the stage maximum value obtained for a drive type; and setting the maximum number of destage TCBs to a destage maximum optimal value that comprises the destage maximum value obtained for a drive type.

12. The system of claim 7, wherein the program instructions further perform operations comprising:

determining the actual number of stage TCBs and the actual number of destage TCBs based on one or more of: read activity from a host, Non-Volatile Storage (NVS) usage by rank, and overall NVS usage.

13. A computer-implemented method, comprising operations for:

creating arrays for different drive types, wherein drives in each of the arrays are certified at a same performance level and are of a same drive type;

running performance benchmarks for each of the arrays to compute a stage maximum value and a destage maximum value for each of the drive types;

at run time, in response to determining that a mode indictor indicates a uniform performance mode, setting a maximum number of stage Task Control Blocks (TCBs) to a stage maximum uniform value that comprises a minimum of the stage maximum values obtained across the drive types;

setting a maximum number of destage TCBs to a destage maximum uniform value that comprises a minimum of the destage maximum values obtained across the drive types; and adding a first delay to completion of a stage and a second delay to completion of a destage for uniform performance across the drive types;

performing the stage of first data using an actual number of stage TCBs that do not exceed the maximum number of stage TCBs and based on the first delay; and performing the destage of second data using an actual number of destage TCBs that do not exceed the maximum number of destage TCBs and based on the second delay.

14. The computer-implemented method of claim 13, wherein each of the stage TCBs and the destage TCBs describes a state of a corresponding task.

15. The computer-implemented method of claim 13, further comprising operations for:

running additional performance benchmarks for each of the arrays to compute an average response time stage value for each of the drive types; and in response to determining that the stage of the first data is near completion, computing the first delay as an average response time stage value for a drive type of a drive being used by the stage less a minimum response time stage value, wherein the minimum response time stage value comprises a minimum of the average response time stage values obtained across the drive types.

16. The computer-implemented method of claim 13, further comprising operations for:

running additional performance benchmarks for each of the arrays to compute an average response time destage value for each of the drive types; and in response to determining that the destage of the second data is near completion, computing the second delay as an average response time destage value for a drive type of a drive being used by the destage less a minimum response time destage value, wherein the minimum response time destage value comprises a minimum of the average response time destage values obtained across the drive types.

17. The computer-implemented method of claim 13, further comprising operations for:

at the run time, in response to determining that the mode indictor does not indicate the uniform performance mode, setting the maximum number of stage TCBs to a stage maximum optimal value that comprises the stage maximum value obtained for a drive type; and setting the maximum number of destage TCBs to a destage maximum optimal value that comprises the destage maximum value obtained for a drive type.

* * * * *